(12) United States Patent
Mendoza

(10) Patent No.: US 9,266,476 B2
(45) Date of Patent: Feb. 23, 2016

(54) EXTENDABLE STEP FOR A TRUCK

(71) Applicant: Arthur Ignatius Mendoza, Crown Point, IN (US)

(72) Inventor: Arthur Ignatius Mendoza, Crown Point, IN (US)

( * ) Notice: Subject to any disclaimer, the term of this patent is extended or adjusted under 35 U.S.C. 154(b) by 0 days.

(21) Appl. No.: 14/495,392

(22) Filed: Sep. 24, 2014

(65) Prior Publication Data

US 2015/0084304 A1 Mar. 26, 2015

Related U.S. Application Data

(60) Provisional application No. 61/881,550, filed on Sep. 24, 2013.

(51) Int. Cl.
*B60R 3/00* (2006.01)
*B60R 3/02* (2006.01)
*B60D 1/52* (2006.01)
*B60D 1/58* (2006.01)

(52) U.S. Cl.
CPC ... *B60R 3/02* (2013.01); *B60D 1/52* (2013.01); *B60D 1/58* (2013.01)

(58) Field of Classification Search
CPC .............. B60R 3/007; B60R 3/00; B60R 3/02

USPC .......................... 280/163, 166, 169, 762, 727
See application file for complete search history.

(56) References Cited

U.S. PATENT DOCUMENTS

| | | | | |
|---|---|---|---|---|
| 5,738,362 A * | 4/1998 | Ludwick | ....................... | 280/166 |
| 6,237,927 B1 | 5/2001 | Debo | | |
| 6,474,668 B2 * | 11/2002 | Debo | ............................ | 280/166 |
| 6,530,588 B1 * | 3/2003 | Varney et al. | ................. | 280/166 |
| 6,685,204 B1 * | 2/2004 | Hehr | ............................. | 280/166 |
| 7,195,262 B2 * | 3/2007 | Chaudoin et al. | ............. | 280/166 |
| 7,635,247 B2 * | 12/2009 | Collins | ......................... | 414/462 |
| 7,766,357 B2 * | 8/2010 | Arvanites | ...................... | 280/166 |
| 7,967,311 B2 * | 6/2011 | Phillips | ........................ | 280/166 |
| 2006/0170179 A1 * | 8/2006 | Dahl | ............................. | 280/163 |

* cited by examiner

*Primary Examiner* — James M Dolak

(57) ABSTRACT

An extendable step with a receiver assembly and a step assembly for a pickup truck is provided. The receiver assembly includes a receiver tube with an internal channel. The receiver tube is configured to attach to a hitch of a vehicle, such as a pick-up truck. The step assembly may include an elongated step tube that slidably engages with the receiver tube. A step plate is attached to the elongated step tube and a foot pedal is attached beneath the step plate and protrudes downward and away from the step plate. A user may place there foot onto the foot pedal and pull the step plate from a retracted position to an extended position In which the step plate extends from the receiver tube.

12 Claims, 5 Drawing Sheets

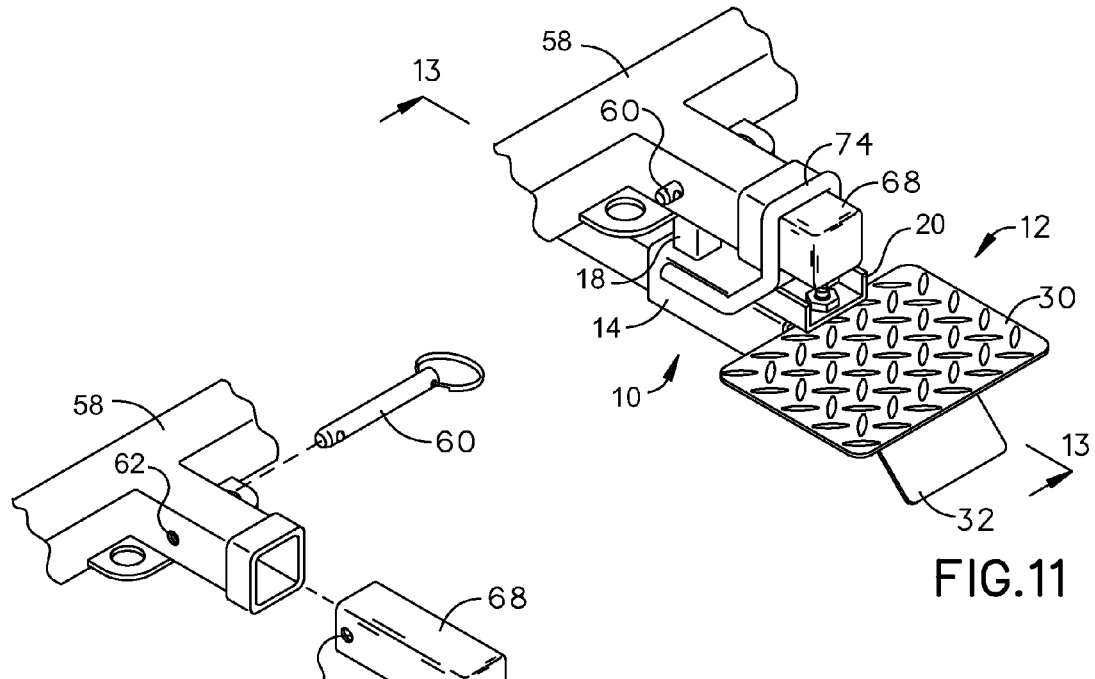
FIG.11
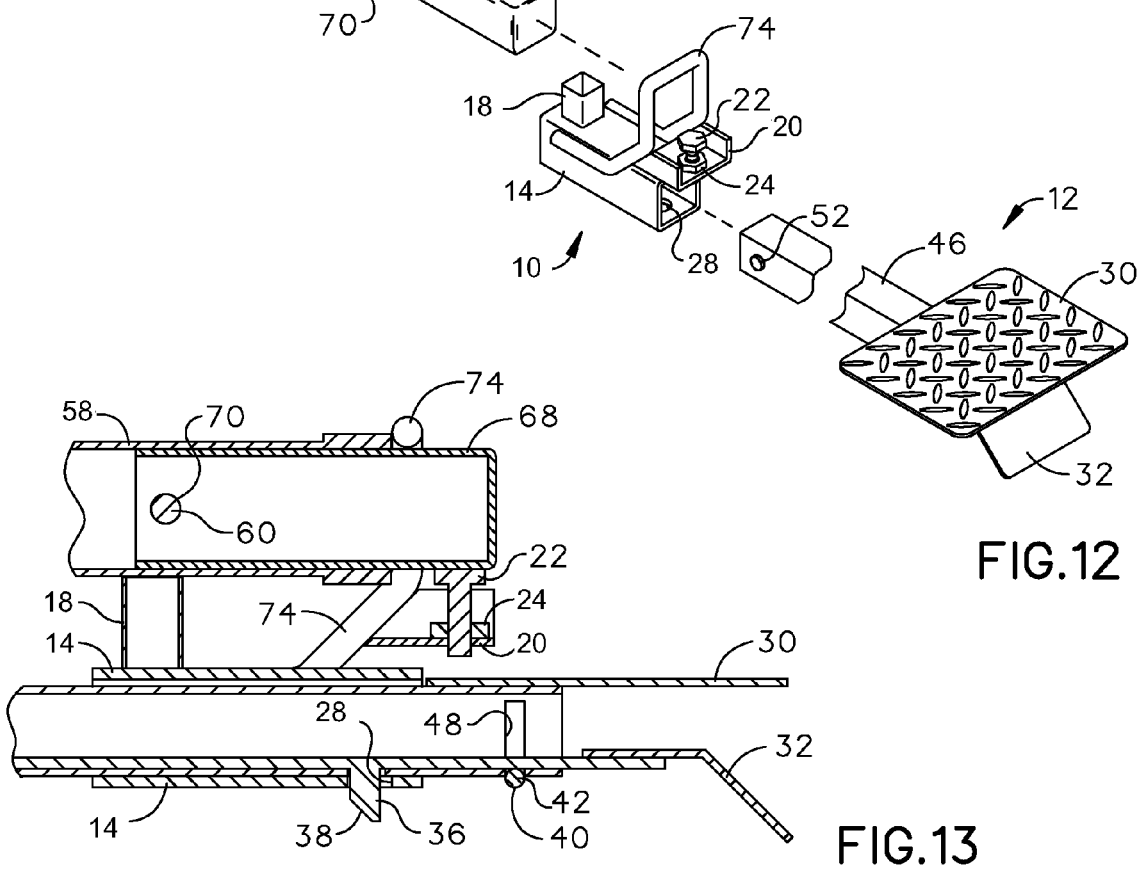
FIG.12
FIG.13

EXTENDABLE STEP FOR A TRUCK

CROSS-REFERENCE TO RELATED APPLICATION

This application claims the benefit of priority of U.S. provisional application No. 61/881,550, filed Sep. 24, 2013, the contents of which are herein incorporated by reference.

BACKGROUND OF THE INVENTION

The present invention relates to a foot step for a truck bed and, more particularly, to a foot step that attaches to and extends from the trailer hitch of a pick-up truck.

Currently, pick-up trucks tend to have a high ground clearance. Therefore, after opening the tailgate, climbing into the truck bed may be difficult. Currently, devices such as pedals are attached to the truck to aid people in climbing into the truck bed. However, these devices need special brackets for each model of trucks, making them much more expensive and complicated to install.

As can be seen, there is a need for an easy to use and easy to attach foot step for a truck bed.

SUMMARY OF THE INVENTION

In one aspect of the present invention, an extendable step comprises: a receiver tube comprising a top portion, a bottom portion, and a pair of side portions and configured to attach to a hitch of a vehicle; an elongated step tube having a front end, a rear end, a pair of sides, a top, and a bottom, and slidably engaging the receiver tube; a step plate attached to the front end of the elongated step tube; and a foot pedal attached beneath the step plate and protruding downward and away from the step plate, wherein the extendable step comprises an extended position comprising the step plate extending from the receiver tube, and a retracted position comprising the step plate adjacent to the receiver tube.

These and other features, aspects and advantages of the present invention will become better understood with reference to the following drawings, description and claims.

BRIEF DESCRIPTION OF THE DRAWINGS

FIG. 11 is a perspective view an alternate embodiment of the present invention;

FIG. 12 is an exploded view an alternate embodiment of the present invention; and FIG. 13 is a section view of the present invention, taken along line 13-13 in FIG. 11.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention is a universal pull out step for a pick-up truck so that a user may step up onto the tail gate when it is in the open position. The present invention may fit on any pick-up truck that has a hitch attachment since the present invention may use the same pin to hold it in place that is used to hold the hitch. The present invention does not need special brackets to attach to the pick-up truck. A user may purchase the product and easily install the device on any pick-up truck. The present invention is easy to install, and relatively inexpensive.

Figure 1:
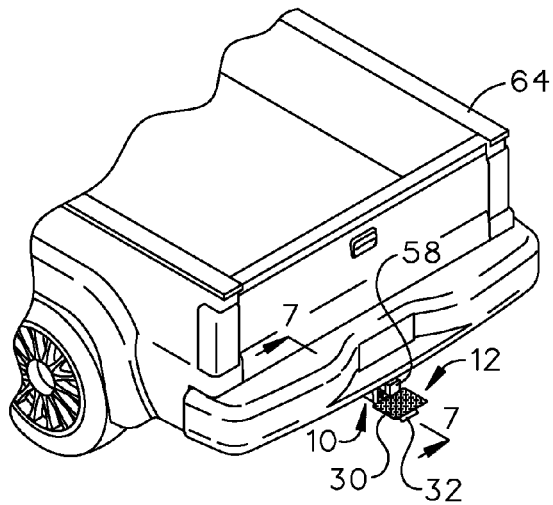
FIG. 1 is a perspective view of the present invention, shown in use, with the step assembly in the retracted position.
Figure 2:
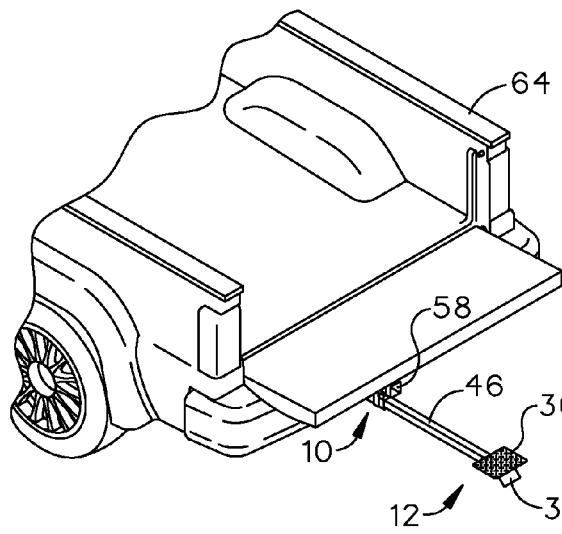
FIG. 2 is a perspective view of the present invention, shown in use, with the step assembly in the extended position.
Figure 3:
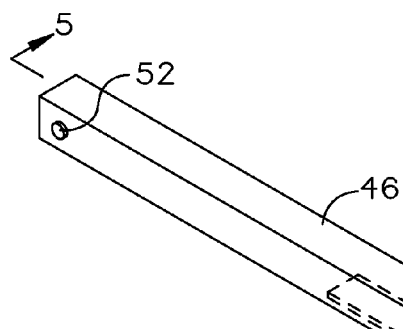
FIG. 3 is a perspective view of the present invention.
Figure 3:
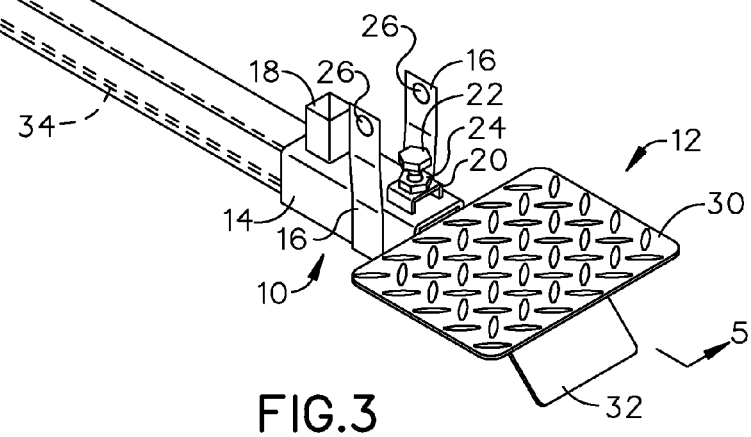
Figure 4:
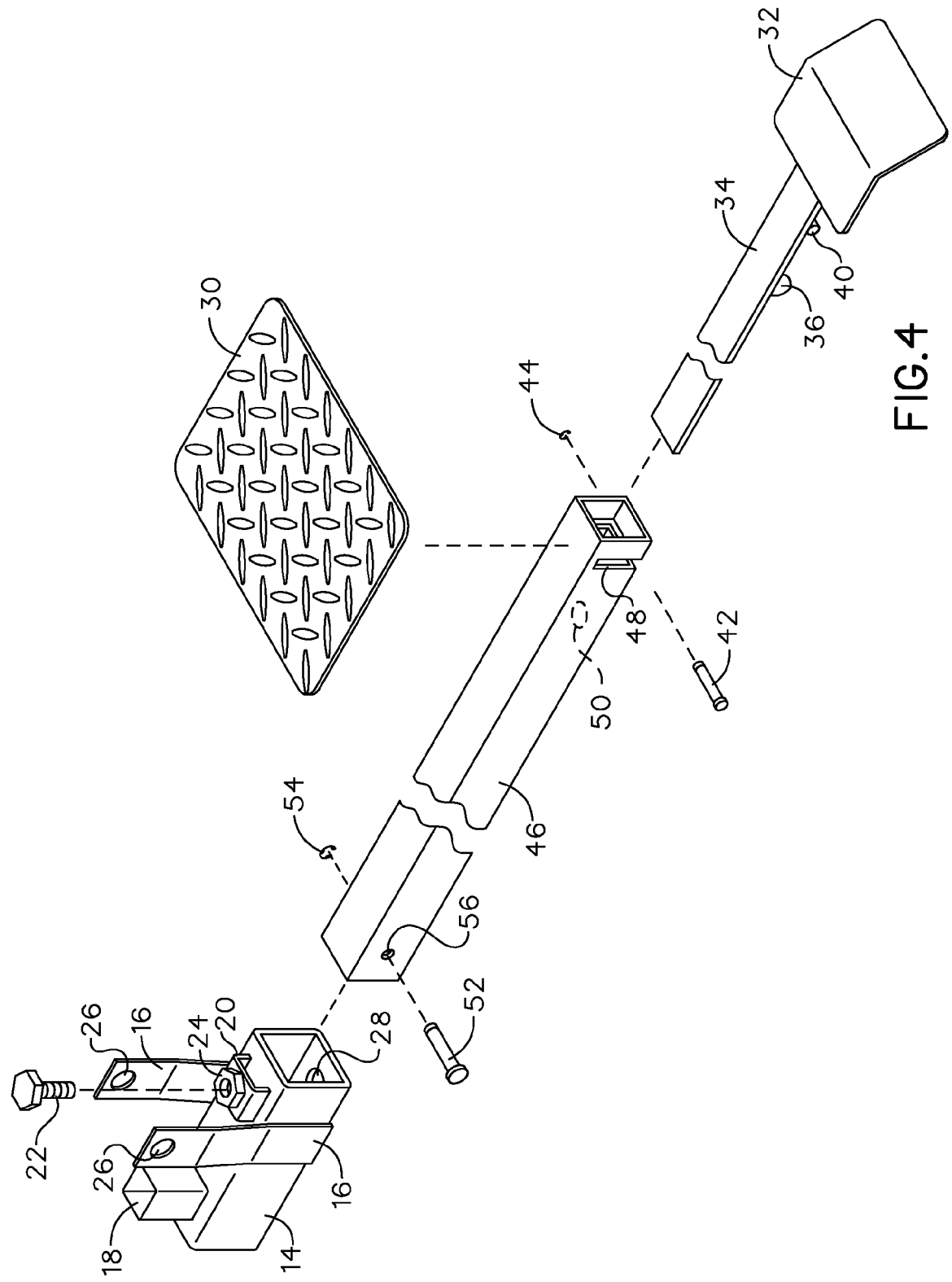
FIG. 4 is an exploded view of the present invention.
Figure 5:
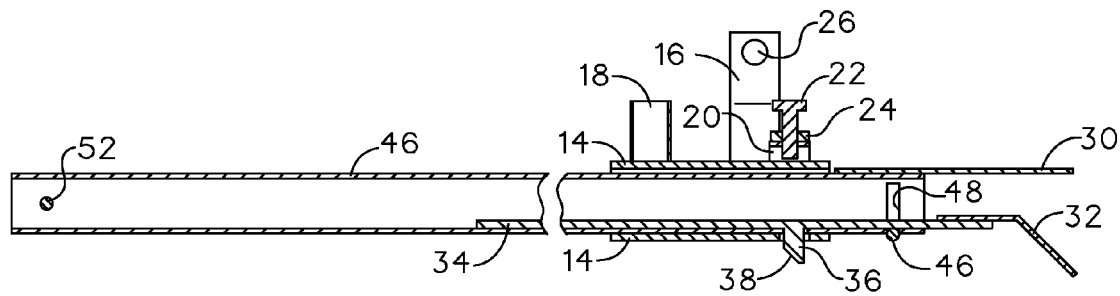
FIG. 5 is a section view of the present invention, taken along line 5-5 in FIG. 3.
Figure 6:
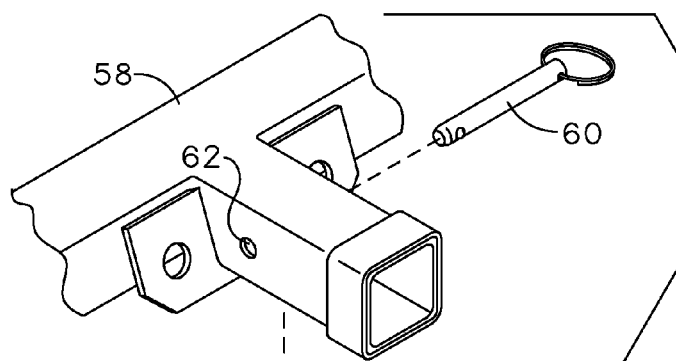
FIG. 6 is an exploded view, illustrating the attachment of receiver to an exemplary hitch.
Figure 7B:
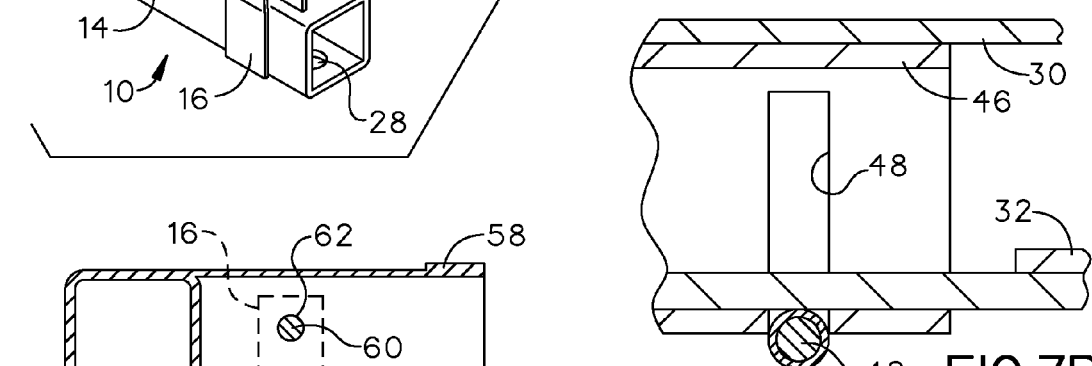
FIG. 7B is a detail section view of the present invention.
Figure 7A:
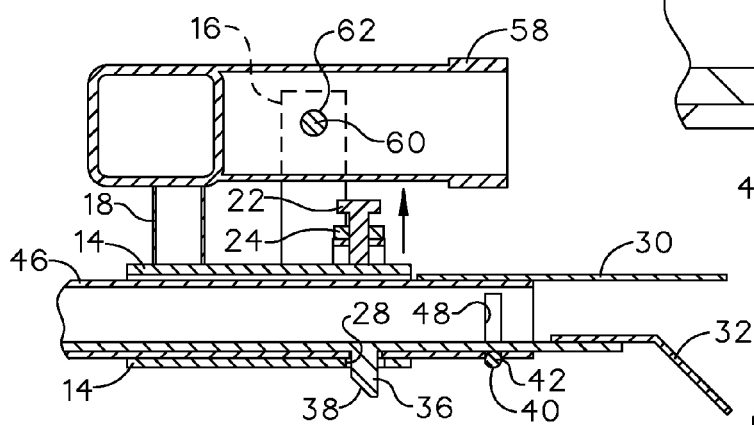
FIG. 7A is a section view of the present invention, shown attached to the exemplary hitch, illustrating the tightening of set bolt.
Figure 8:
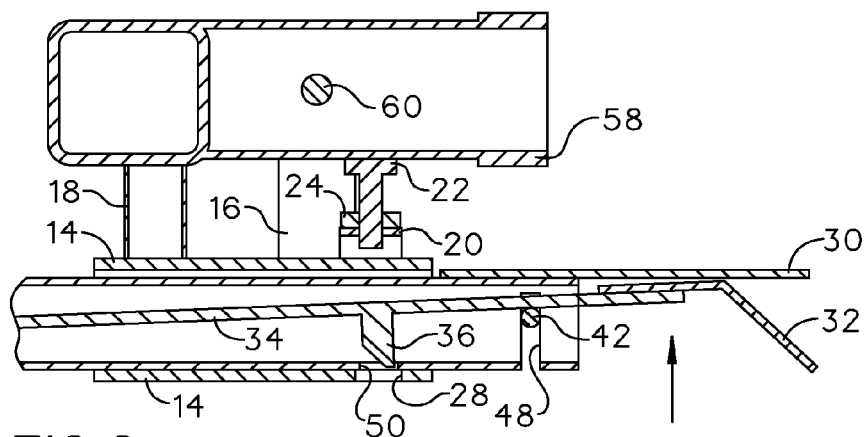
FIG. 8 is a section view of the present invention, illustrating the lifting of the step assembly.
Figure 9:
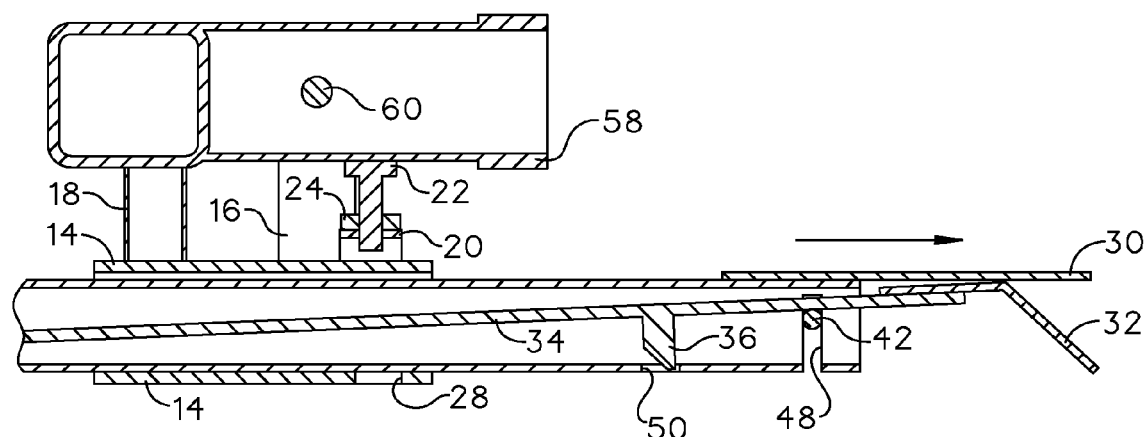
FIG. 9 is a section view of the present invention, illustrating the extending of the step assembly.
Figure 10:
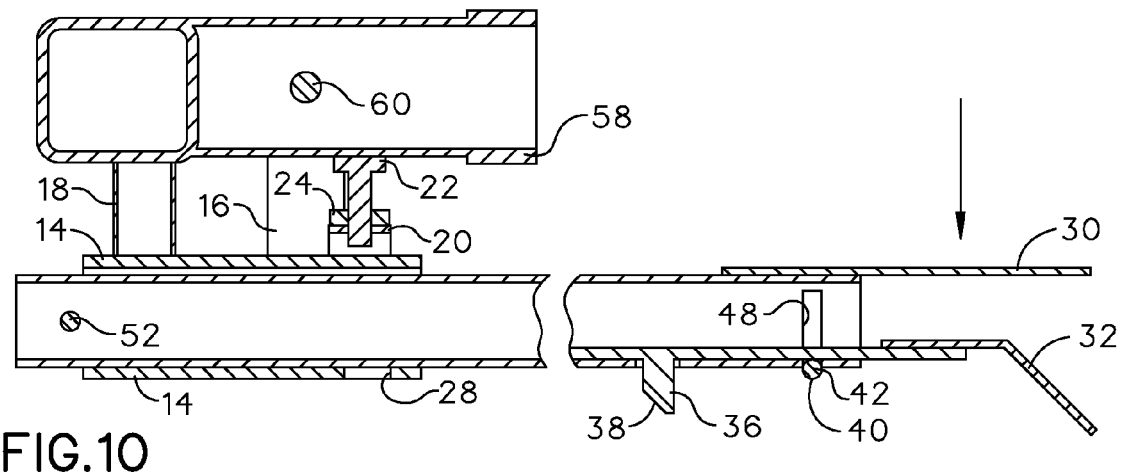
FIG. 10 is a section view of the present invention, with the step assembly in the fully extended position.

Referring to FIGS. 1 through 13, the present invention includes an extendable step with a receiver assembly 10 and a step assembly 12. The receiver assembly 10 includes a receiver tube 14 with an internal channel. The receiver tube 14 is configured to attach to a hitch 58 of a vehicle, such as a pick-up truck 64. The step assembly 12 may include an elongated step tube 46 that slidably engages with the receiver tube 14. A step plate 30 is attached to the elongated step tube 46 and a foot pedal 32 is attached beneath the step plate 30 and protrudes downward and away from the step plate 30. A user may place there foot onto the foot pedal 32 and pull the step plate 30 from a retracted position to an extended position in which the step plate 30 extends from the receiver tube 14.

The receiver tube 14 of the present invention includes a top portion, a bottom portion, and a pair of side portions forming an internal channel in between. The elongated step tube 46 may slidably engage the receiver tube 14 within the internal channel. In certain embodiments, at least one stabilizer 18, 22 may be attached to extend from the top portion of the receiver tube 14. For example, a post 18 may extend from the top portion of the receiver tube 14 near a first end, and an extendable bolt 22 may extend from the top portion of the receiver tube 14 near a second send. The stabilizers 18, 22 may press against the hitch 58 when the receiver tube 14 is attached, and may therefore keep the receiver tube 14 steady while the present invention is in use. The extendable bolt 22 may be attached to the receiver tube 14 by a set bolt bracket 20 and a bracket nut 24. The extendable bolt 22 and the bracket nut 24 may be rotated to extend the bolt 22 and apply pressure against the hitch 58.

The elongated step tube 46 includes a front end, a rear end, a pair of sides, a top, and a bottom. The step plate 30 of the present invention may be attached to the top of the elongated step tube 46 at the front end. The step plate 30 may include tread to prevent slipping. In certain embodiments, the elongated step tube 46 may include a stop 52. The stop 52 may be secured to the elongated step tube 46 at the rear end, and may prevent the entire step tube 46 from sliding out of the receiver tube 14. In certain embodiments, the stop 52 may be removable from the elongated step tube 46 to easily assemble and disassemble the extendable step. For example, the stop 52 may be a pin within a pin hole 56, which may be secured by a stop pin clip 54.

In certain embodiments, the present invention may include a pedal bar 34. The pedal bar 34 may include a first end and a second end. The foot pedal 32 may be attached to and extend from the first end of the pedal bar 34. The pedal bar 34 may be secured within the elongated step tube 46. A locking post 36 may extend from the bottom of the pedal bar 34, and is formed to fit within a first aperture 50 and a second aperture 28 in the retracted position. The first aperture 50 may be through the elongated step tube 46, and a second aperture 28 may be through the receiver tube 14. The first and second apertures 50, 28 align with one another.

The elongated step tube 46 of the present invention may further include a slot channel 48 near the front end through the pair of sides, and extending from the bottom end and up to near the top end. A lock pin 42 may be attached to the pedal bar 34. The lock pin 42 may slide up and down within the slot channel 48. The lock pin 42 may include a pair of ends extending through the slot channel 48 on the sides of the elongated step tube 46, thereby attaching the pedal bar 34 to the elongated step tube 46. In certain embodiments, the lock pin 42 may be removable from the pedal bar 34 to easily take the extendable step apart. For example, the pedal bar 34 may include a pin slot 40. The lock pin 42 may fit within the pin slot 40 and may be secured to the pin slot by a retaining clip 44.

The receiver tube 14 may attach the hitch 58 in a various amount of ways. For example, a pair of bracket flanges 16 may be attached to the side portions of the receiver tube 14. The pair of bracket flanges 16 may protrude upwards from the top portion of the receiver tube 14. The bracket flanges 16 may include bracket apertures 26 that align with hitch apertures 62. A hitch pin 60 may fit through the bracket apertures 26 and through the hitch apertures 62. The bolt 22 and the nut 24 may be tightened to apply pressure to the hitch 58, and thereby apply pressure to the hitch pin 60, securing the receiver tube 14 to the truck 64.

In alternate embodiments, the present invention may include a hitch stump 68. The hitch stump 68 may fit within a hitch 58 and may include stump apertures 70. The stump apertures 70 may align with the hitch apertures 62. The hitch pin 60 may fit through the aligned stump and hitch apertures 70, 62. A bracket hook 74 may be attached to the side portions of the receiver tube 14. The bracket hook 74 may protrude upwards from the top portion of the receiver tube 14. The bracket hook 74 is sized to fit around and secure to the hitch stump 68. The bolt 22 and the nut 24 may be tightened to apply pressure to the hitch stump 68, and thereby apply pressure to the hitch pin 60, securing the receiver tube 14 to the truck 64.

A method of using the present invention may include the following. A user may place their foot underneath the foot pedal 32 and lift the locking post 36 out of the first and second apertures 50, 28. The lock pin 42 may slide upward within the channel slot 48. The user may then pull the step tube 46 out of the receiver tube 14 towards them. The stop 52 may prevent the step tube 46 from being removed completely from the receiver tube 14. The user may then open the hatch of the truck 64. The step plate 30 may extend past the opened hatch. Therefore, a user may easily climb into the truck using the step plate 30. Once finished, the user may push the step tube 46 back through the receiver tube 14 so that the locking post 36 is secured back within the first and second apertures 50, 28.

It should be understood, of course, that the foregoing relates to exemplary embodiments of the invention and that modifications may be made without departing from the spirit and scope of the invention as set forth in the following claims.

What is claimed is:

1. An extendable step comprising:
    a receiver tube comprising a top portion, a bottom portion, and a pair of side portions and configured to attach to a hitch of a vehicle;
    an elongated step tube having a front end, a rear end, a pair of sides, a top, and a bottom forming an internal housing therebetween, wherein a front opening is formed at the front end leading into the internal housing, wherein the elongated step tube is slidably engaged within the receiver tube;
    a step plate attached to the front end of the elongated step tube;
    a pedal bar comprising a first end and a second end, and wherein the pedal bar is disposed within the internal housing through the front opening of the elongated step tube; and
    a foot pedal attached to the first end of the pedal bar and disposed beneath the step plate, wherein the foot pedal protrudes downward and away from the step plate,
    wherein the extendable step comprises an extended position comprising the step plate extending from the receiver tube, and a retracted position comprising the step plate adjacent to the receiver tube.

2. The extendable step of claim 1, further comprising a locking post attached to and extending from the pedal bar, and formed to fit within a first aperture through the elongated step tube, and a second aperture through the receiver tube in the retracted position.

3. The extendable step of claim 2, wherein the elongated step tube comprises a slot channel near the front end through the pair of sides, and extending from the bottom end and up to near the top end.

4. The extendable step of claim 3, further comprising a lock pin attached to the pedal bar and slidable within the slot channel, wherein the lock pin comprises a pair of ends extending through the slot channel on the pair of sides, thereby attaching the pedal bar to the elongated step tube.

5. The extendable step of claim 4, further comprising a pin slot located on the pedal bar, wherein the lock pin is removably attachable within the pin slot.

6. The extendable step of claim 1, further comprising a pair of bracket flanges attached to and protruding upwards from the top portion of the receiver tube and attachable to the hitch of the vehicle.

7. The extendable step of claim 1, further comprising a hitch stump attachable to the hitch, and a bracket hook attached to and protruding upwards from the top portion of the receiver tube, wherein the bracket hook is sized to hook onto the hitch stump.

8. The extendable step of claim 1, further comprising at least one stabilizer protruding from the top portion of the receiver tube and positioned to press against the hitch.

9. The extendable step of claim 8, wherein the at least one stabilizer comprises a post extending from the top portion of the receiver tube near a first end, and an extendable bolt attached to the receiver tube near a second end.

10. An extendable step comprising:
    a receiver tube comprising a top portion, a bottom portion, and a pair of side portions and configured to attach to a hitch of a vehicle so that the receiver tube is disposed below a hitch receiver;
    an elongated step tube having a front end, a rear end, a pair of sides, a top, and a bottom, and slidably engaged from the front end to the rear end within the receiver tube;
    a stop secured to the rear end of the elongated step tube; and a step plate attached to the front end of the elongated step tube;

wherein the extendable step comprises an extended position comprising the step plate extending away from the receiver tube, and a retracted position comprising the step plate adjacent to the receiver tube; and further comprising at least one stabilizer protruding from the top portion of the receiver tube and positioned to press against the hitch at an outside bottom portion thereof.

11. The extendable step of claim 10, further comprising a pair of bracket flanges attached to and protruding upwards from the top portion of the receiver tube and attachable to the hitch receiver of the vehicle, wherein the pair of bracket flanges are parallel with the side portions of the receiver tube.

12. The extendable step of claim 11, wherein the at least one stabilizer comprises a post extending from the top portion of the receiver tube near a first end, and an extendable bolt attached to the receiver tube near a second end.

\* \* \* \* \*